United States Patent
Diestelhorst et al.

(10) Patent No.: US 9,459,877 B2
(45) Date of Patent: Oct. 4, 2016

(54) NESTED SPECULATIVE REGIONS FOR A SYNCHRONIZATION FACILITY

(71) Applicant: Advanced Micro Devices, Inc., Sunnyvale, CA (US)

(72) Inventors: Stephan Diestelhorst, Dresden (DE); Martin Pohlack, Dresden (DE); Michael Hohmuth, Dresden (DE); David Christie, Austin, TX (US); Luke Yen, Ayer, MA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 731 days.

(21) Appl. No.: 13/723,296

(22) Filed: Dec. 21, 2012

(65) Prior Publication Data

US 2014/0181480 A1 Jun. 26, 2014

(51) Int. Cl.
*G06F 9/38* (2006.01)
*G06F 9/52* (2006.01)

(52) U.S. Cl.
CPC .......... *G06F 9/3842* (2013.01); *G06F 9/3857* (2013.01); *G06F 9/3861* (2013.01); *G06F 9/528* (2013.01)

(58) Field of Classification Search
None
See application file for complete search history.

(56) References Cited

U.S. PATENT DOCUMENTS

| | | | | |
|---|---|---|---|---|
| 7,779,307 B1 * | 8/2010 | Favor | ................. | G06F 11/1407 714/38.1 |
| 8,127,057 B2 * | 2/2012 | Chung | ...................... | G06F 5/16 710/52 |
| 8,195,917 B2 | 6/2012 | Hohmuth et al. | | |
| 2010/0023703 A1 * | 1/2010 | Christie | .................. | G06F 9/466 711/147 |
| 2010/0023704 A1 | 1/2010 | Christie et al. | | |
| 2010/0023706 A1 * | 1/2010 | Christie | .................. | G06F 9/466 711/150 |
| 2010/0023707 A1 * | 1/2010 | Hohmuth | ................ | G06F 9/466 711/152 |
| 2010/0205408 A1 | 8/2010 | Chung et al. | | |
| 2011/0208921 A1 | 8/2011 | Pohlack et al. | | |
| 2011/0209151 A1 | 8/2011 | Chung et al. | | |
| 2011/0231630 A1 | 9/2011 | Dannowski et al. | | |
| 2011/0246724 A1 * | 10/2011 | Marathe | .................. | G06F 9/467 711/147 |
| 2011/0307689 A1 * | 12/2011 | Chung | .................. | G06F 9/3004 712/234 |
| 2012/0124293 A1 * | 5/2012 | Chung | .................. | G06F 9/3834 711/128 |
| 2012/0124563 A1 | 5/2012 | Chung et al. | | |
| 2012/0159084 A1 | 6/2012 | Pohlack et al. | | |
| 2012/0227045 A1 * | 9/2012 | Knauth | ................. | G06F 9/3863 718/100 |
| 2012/0233411 A1 | 9/2012 | Christie et al. | | |

* cited by examiner

*Primary Examiner* — William B Partridge
(74) *Attorney, Agent, or Firm* — Volpe and Koenig, P.C.

(57) ABSTRACT

An apparatus, computer readable medium, and method of performing nested speculative regions are presented. The method includes responding to entering a speculative region by storing link information to an abort handler and responding to a commit command by removing link information from the abort handler. The method may include storing link information to the abort handler associated with the speculative region. When the speculative region is nested, the method may include storing link information to an abort handler associated with a previous speculative region. Removing link information may include removing link information from the abort handler associated with the corresponding speculative region. The method may include restoring link information to the abort handler associated with a previous speculative region. Responding to an abort command may include running the abort handler associated with the aborted speculative region. The method may include running the abort handler of each previous speculative region.

13 Claims, 8 Drawing Sheets

450: ------------Nested Speculative Region ------------
451: Nested_Speculate
452:     SPECULATE
453:     JNZ Nested_abort
454:     Access memory locations 644, 645
455:     COMMIT
456:     Return
457: Nested_abort:
458:     // Clean up modifications made by Nested Speculative
459:     // Region (registers, non-speculative modification)
460:     // Keep statistics about an abort of this speculative region
461:     // Test if we need further unwinding (rAX)
462:     TEST rAX, ASF_NEST_MASK
463:     JZ Nest_Done
464:     // Unwind the stack of abort handlers in software
465:     SUB rAX, 1 << ASF_NEST_START // Reduce nesting count
466:     POP rDI   // get outer Abort_rIP or saved instruction pointer
467:     POP rSP   // get outer Abort_rSP or saved stack pointer
468:     JMP [rDI]   // branch to outer abort handler
470: Nest_Done:
471:     // Normal handling of non-nested aborts, e.g.
472:     JMP Nested_Speculate

FIG. 6B

NESTED SPECULATIVE REGIONS FOR A SYNCHRONIZATION FACILITY

TECHNICAL FIELD

The disclosed embodiments are generally directed to nested speculative regions, and in particular, to nested speculative regions for a synchronization facility.

BACKGROUND

Many modern computers have multiple processors or cores that share memory. One challenge with multiple processors is how to permit the multiple processors to share memory.

A synchronization facility allows modification of multiple memory locations (often called a "working set") by a single region of instructions (often called a "speculative region") executed by a single processor. The synchronization facility allows a speculative region to access the working set of memory locations, while watching the working set to detect accesses from other speculative regions being executed by other processors.

If another processor accesses a memory location of the working set, then the synchronization facility determines that there is a conflict and aborts one of the speculative regions. This enables the cores to share the memory without interfering with one another.

Therefore, there is a need in the art for an apparatus and method of performing nested speculative regions for a synchronization facility.

SUMMARY OF EMBODIMENTS

Some embodiments provide a method of performing nested speculative regions. The method includes responding to entering a speculative region by storing link information to an abort handler and responding to a commit command by removing link information from the abort handler. The method may include storing link information to the abort handler associated with the speculative region. When the speculative region is nested, the method may include storing link information to an abort handler associated with a previous speculative region. Removing link information may include removing link information from the abort handler associated with the corresponding speculative region. The method may include restoring link information to the abort handler associated with a previous speculative region. Responding to an abort command may include running the abort handler associated with the aborted speculative region. The method may include running the abort handler of each previous speculative region.

Some embodiments provide an apparatus for performing nested speculative regions. The apparatus includes two or more processors where each processor may include an instruction pointer (IP) register, a stack pointer (SP) register, a saved_rIP register, and a saved_rSP register. The apparatus may include a memory comprising memory locations. Each processor of the two or more processors may be configured to respond to entering a speculative region by storing link information to an abort handler associated with the speculative region, and if the speculative region is nested, then storing link information to an abort handler associated with a previous speculative region. Each processor of the two or more processors may respond to a commit command by removing link information to the abort handler associated with the corresponding speculative region, and if the commit is nested, then restoring link information to the abort handler associated with the previous speculative region. Each processor of the two or more processors may respond to an abort command by running the abort handler associated with the aborted speculative region, and if the aborted speculative region is nested, then for each previous speculative region, running the abort handler of the previous speculative region.

BRIEF DESCRIPTION OF THE DRAWINGS

A more detailed understanding may be had from the following description, given by way of example in conjunction with the accompanying drawings wherein:

FIGS. 6A and 6B schematically illustrates code with speculative regions, in accordance with some embodiments.

DETAILED DESCRIPTION OF EMBODIMENTS

Figure 1:
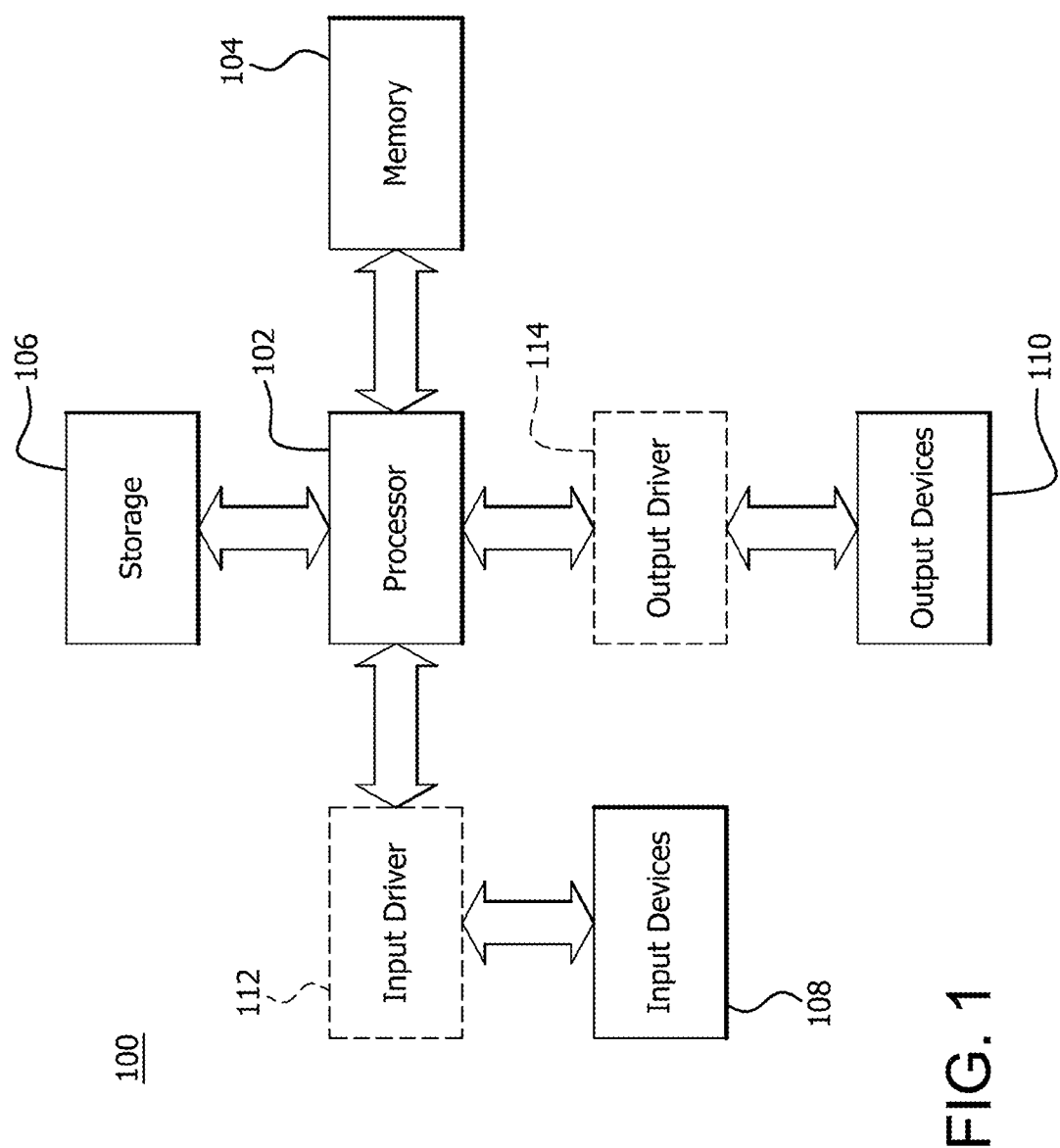
FIG. 1 is a block diagram of an example device in which one or more disclosed embodiments may be implemented.

FIG. 1 is a block diagram of an example device 100 in which one or more disclosed embodiments may be implemented. The device 100 may include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 may also optionally include an input driver 112 and an output driver 114. It is understood that the device 100 may include additional components not shown in FIG. 1.

The processor 102 may include a central processing unit (CPU), a graphics processing unit (GPU), a CPU and GPU located on the same die, or one or more processor cores, wherein each processor core may be a CPU or a GPU. The CPU may include a synchronization facility for synchronizing memory access among multiple processors. The memory 104 may be located on the same die as the processor 102, or may be located separately from the processor 102. The memory 104 may include a volatile or non-volatile memory, for example, random access memory (RAM), dynamic RAM, or a cache. The memory 104 may include a synchronization facility.

The storage 106 may include a fixed or removable storage, for example, a hard disk drive, a solid state drive, an optical disk, or a flash drive. The input devices 108 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 may include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
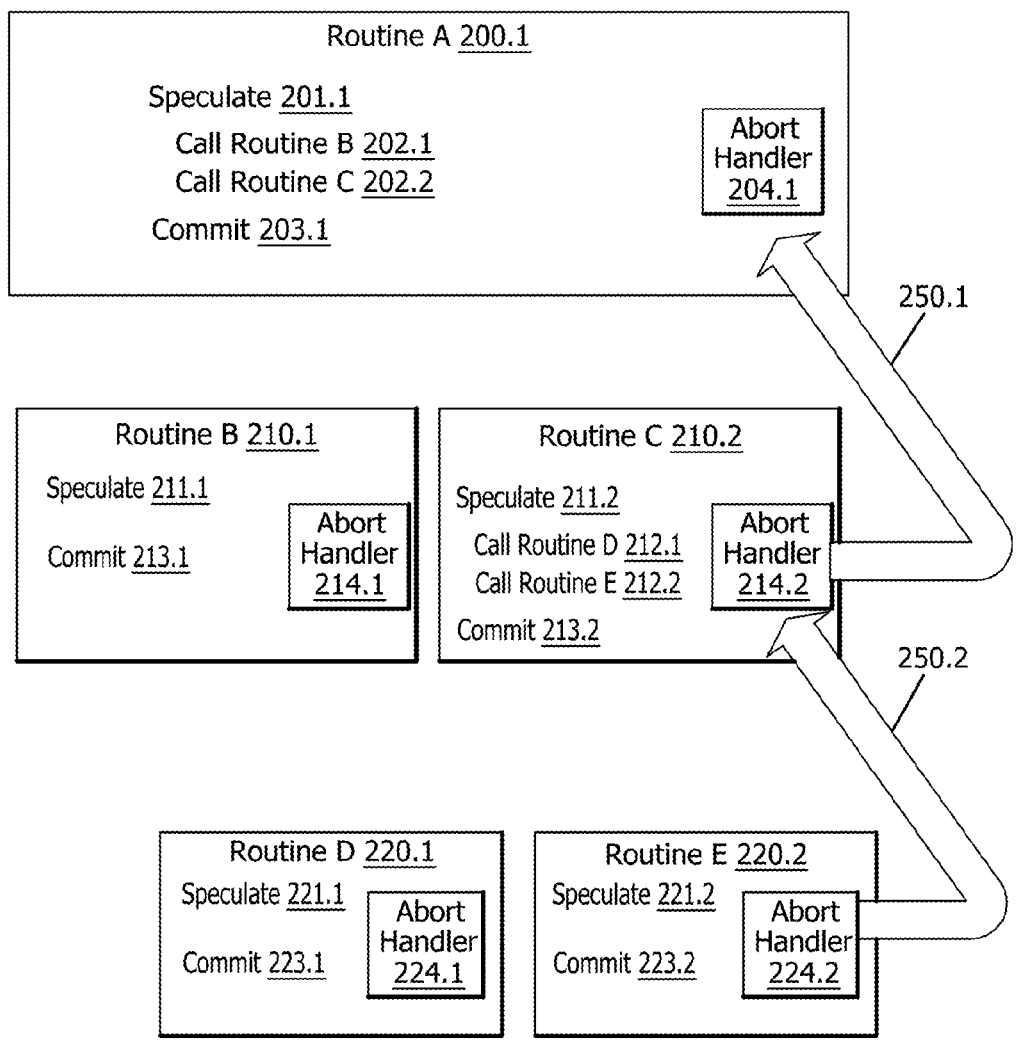
FIG. 2 schematically illustrates an example of the operation of an embodiment of an apparatus and method for nested speculative regions for a synchronization facility, in accordance with some embodiments.

FIG. 2 schematically illustrates an example of the operation of an embodiment of an apparatus and method for nested speculative regions for a synchronization facility. Illustrated in FIG. 2 are routines 200.1, 210.1, 210.2, 220.1, and 220.2 and the corresponding abort handlers 204.1, 214.1, 214.2, 224.1, and 224.2 and links 250.1 and 250.2 and. Routines 200.1, 210.1, 210.2, 220.1, and 220.2 may be software implement routines that use a synchronization facility and are being executed by a processor 102. Routines 210.2 and 220.2 are nested routines since they were called by another routine 200.1, and 210.2, respectfully. Abort handlers 204.1, 214.2, 224.2, handle cleanup for a routine 200.1, 210.2, 220.2 when a speculative region has been aborted due to a conflict with another processor. Return arrows 250.2, 250.1 indicate the sequence in which abort handlers 224.2, 214.2, and 204.1 are executed.

Figure 3:
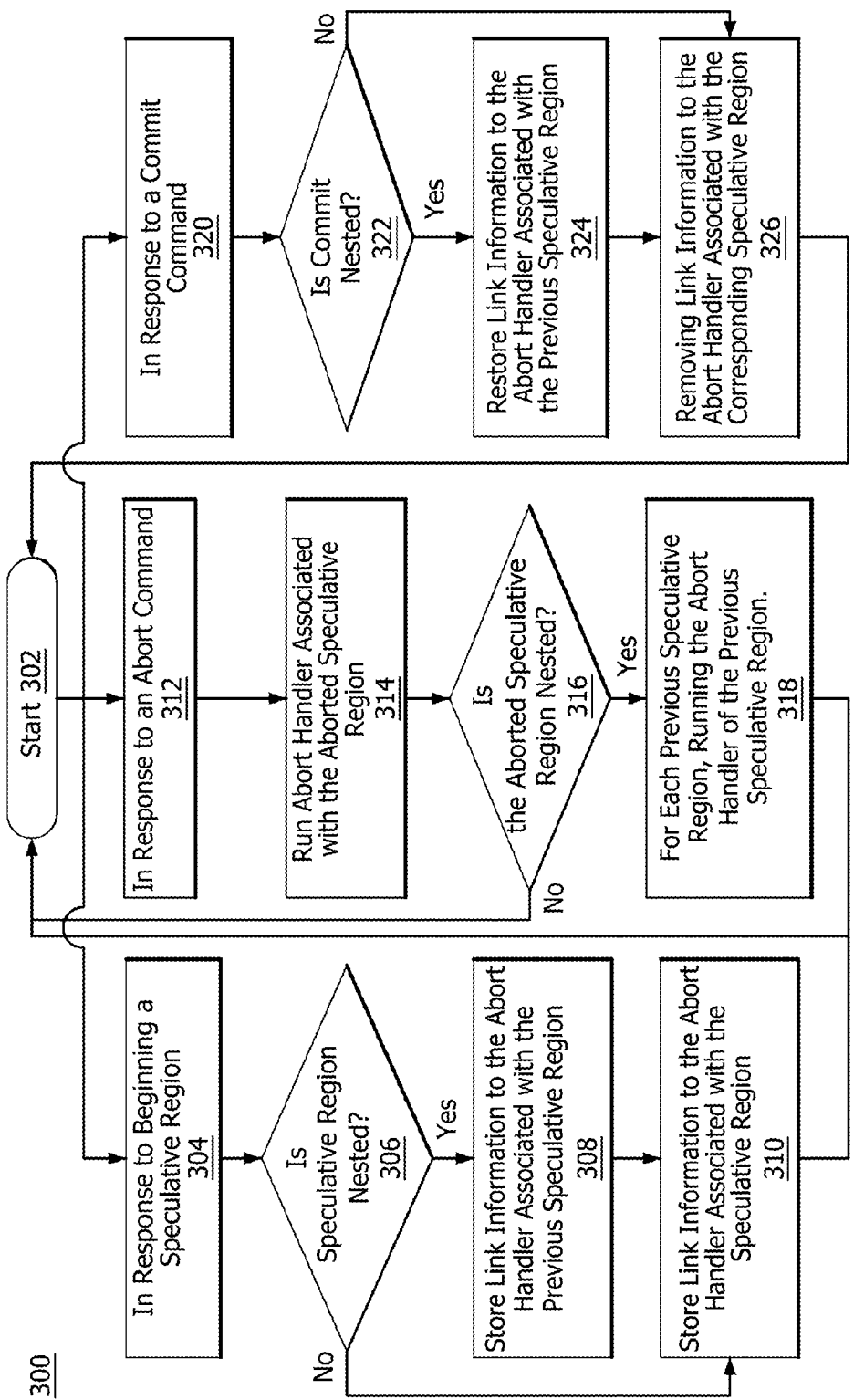
FIG. 3 schematically illustrates an embodiment of a method for performing nested speculative regions, in accordance with some embodiments.

FIG. 3 schematically illustrates an embodiment of a method 300 for performing nested speculative regions. FIG. 3 will be explained with reference to FIG. 2. The method 300 includes responding to beginning a speculative region 304, responding to an abort command 312, and responding to a commit command 320.

The method 300 may begin with in response to beginning a speculative region 304. For example, FIG. 2 begins with speculate 201.1. The method 300 continues with is speculative region nested 306. In this case, speculate 201.1 is not nested as it has not been called by another routine 210.1, 210.2, 220.1, and 220.2. The method 300 continues with store link information to the abort handler associated with the speculative region 310. For example, a link to the abort handler 204.1 may be stored when beginning speculative region 201.1. The method 300 then returns to start 302.

The method 300 may continue with in response to beginning a speculative region 304. For example, routine A 200.1 may continue with call Routine B 202.1. Routine B 210.1 is called and routine B begins with speculate 211.1.

The method 300 continues with is speculative region nested 306. In this case, speculate 211.1 is nested because it was called by routine A 200.1, which was inside a speculative region begun with speculate 201.1, so the method 300 continues with store link information to the abort handler associated with the previous speculative region 308. For example, a link may be stored from abort handler 214.1 to abort handler 204.1.

The method 300 continues with store link information to the abort handler associated with the speculative region 310. For example, a link to the abort handler 214.1 may be stored when entering speculate 211.1. The method 300 then returns to start 302.

The method 300 may continue with in response to a commit command 320. For example, routine B 210.1 may continue with commit 213.1. The method 300 may continue with is commit nested 322. In this case the commit 213.1 is nested, so the method 300 continues with restore link information to the abort handler associated with the previous speculative region 324. Here, the link information to abort handler 204.1 is restored. The method 300 may continue with removing link information to the abort handler associated with the speculative region 326. For example, link information to abort handler 214.1 may be removed.

The method 300 may continue with in response to beginning a speculative region 304. For example, routine B 210.1 may have completed and returned control to routine A 201.1. Routine A may next perform call routine C 202.2. Routine C 210.2 then performs speculate 211.2. The method 300 continues with is speculative region nested 306. In this case, speculate 211.2 is nested because it was called by routine A 200.1, which was inside a speculative region begun with speculate 201.1, so the method 300 continues with store link information to the abort handler associated with the previous speculative region 308. For example, a link may be stored from abort handler 214.2 to abort handler 204.1.

The method 300 may continue with store link information to the abort handler associated with speculative region 310. For example, link information may be stored abort handler 214.2. The method 300 then returns to start 302.

The method 300 may continue with in response to beginning a speculative region 304. For example, routine C 210.2 may continue with call Routine D 212.1. Routine D 212.1 is called and routine D begins with speculate 221.1. The method 300 continues with is speculative region nested 306. In this case, speculate 221.1 is nested because it was called by routine C 210.2, which was inside a speculative region begun with speculate 211.2, so the method 300 continues with store link information to the abort handler associated with the previous speculative region 308. For example, a link may be stored from abort handler 224.1 to abort handler 214.2.

The method 300 continues with store link information to the abort handler associated with the speculative region 310. For example, a link to the abort handler 224.1 may be stored when entering speculate 221.1. The method 300 then returns to start 302.

The method 300 may continue with in response to a commit command 320. For example, routine D 220.1 may continue with commit 223.1. The method 300 may continue with is commit nested 322. Here it is a nested commit, so the method 300 continues with restore link information to the abort handler associated with the previous speculative region 324. For example, link information to the abort handler 214.2 may be restored. The method 300 may continue with removing link information to the abort handler associated with the speculative region 326. For example, link information to 224.1 may be removed.

The method 300 may continue with in response to beginning a speculative region 304. For example, routine D 220.1 may return back to routine C 210.2. Routine C 210.2 may continue with call Routine E 212.2. Routine E 220.2 is called and routine E 220.2 begins with speculate 221.2. The method 300 continues with is speculative region nested 306. In this case, speculate 221.2 is nested because it was called by routine C 210.1, which was inside a speculative region begun with speculate 211.2, so the method 300 continues with store link information to the abort handler associated with the previous speculative region 308. For example, a link 250.2 may be stored from abort handler 224.2 to abort handler 214.2.

The method 300 continues with store link information to the abort handler associated with the speculative region 310. For example, a link to the abort handler 224.2 may be stored when entering speculate 221.2. The method 300 then returns to start 302.

The method 300 may continue with in response to an abort command 320. For example, an abort may occur because another processor may access memory that is part of the working set of memory locations of routine E 220.2.

The method 300 may continue with run abort handler associated with the aborted speculative region 314. For example, the aborted speculative region in FIG. 2 was the region between speculate 221.2 and commit 223.2, so the abort handler 224.2 for this region is abort handler 224.2. Abort handler 224.2 may be called which may reset registers and perform other types of clean-up to undo instructions in the speculative region between speculate 221.2 and commit 223.2. The method 300 may continue with is the aborted speculative region nested 316. For example, since routine E 220.2 was called from routine C 210.2 which had called speculate 211.2, the speculative region is nested. The method 300 may continue with for each previous speculative region, running the abort handler of the previous speculative region 318. For example, abort handler 214.2 associated with routine C 210.2 is the abort handler 214.2 associated with a previous speculative region. The abort handler 214.2 may be called as abort handler 224.2 may have a link 250.2 to abort handler 214.2. Additionally, abort handler 204.1 is a previous speculative region. The abort handler 204.2 may be called as abort handler 214.2 may have a link 250.1 to abort handler 204.1. The method 300 may return to start 302. Routine A may attempt to execute again until an abort does not occur during the execution of routine A or one of the routines that routine A calls.

Figure 4:
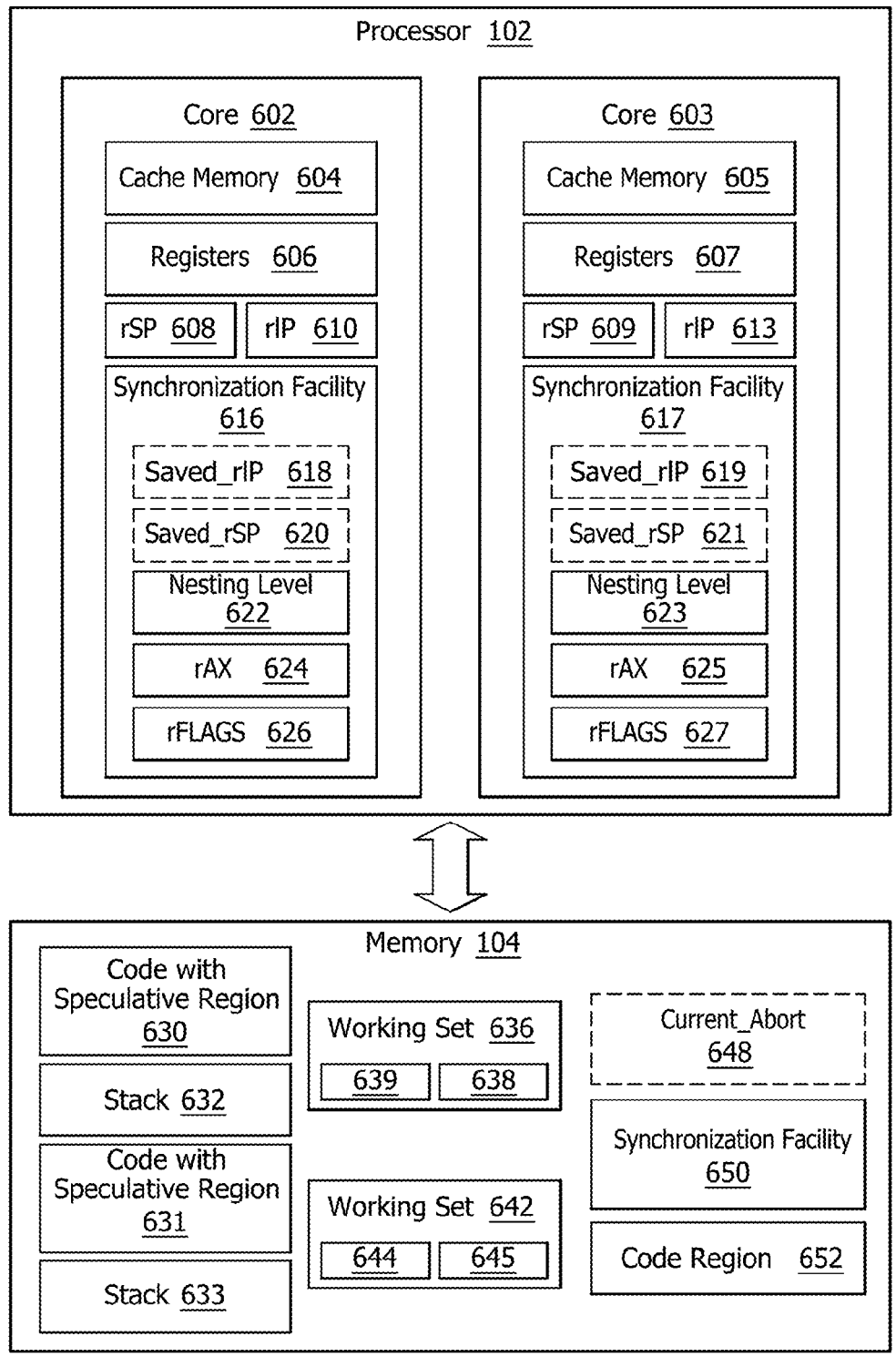
FIG. 4 schematically illustrates an example of an embodiment of an apparatus for nested speculative regions for a synchronization facility, in accordance with some embodiments.

FIG. 4 schematically illustrates an example of an embodiment of an apparatus for nested speculative regions for a synchronization facility.

Illustrated in FIG. 4 is processor 102, which includes two or more cores 602, 604, and memory 104, which may be shared by the two more cores 602, 604.

The cores 602, 604 include cache memory 604, 605, registers 606, 607, rSP 608, 609, rIP 610, 611, and synchronization facility 616, 617.

The cache memory 604, 605 may be a place to store memory locations 104 for quick access and may include facilities for maintaining the consistency of the cache memory 604, 605 with the memory 104. The registers 606, 607 may include registers 606, 607 for storing data, locations, and flags indicating the status of events.

The rSP 608, 609 may be a register stack pointer (rSP) with the address to a stack 632, 633 in memory 104 for use by a currently executing routine. The rIP 610, 613 may be a register instruction pointer (rIP) with the address to code that is to be executed next for a routine.

The synchronization facility 616, 617 may include a saved_rIP 618, 619, a saved_rSP 620, 621, an nesting level 622, 623, rAX 624, 625, and rFLAGS 626, 627. The saved_rIP 618, 619 may be the last rIP 610, 613 before a nested speculative region was called. The saved_rSP 620, 621 may be the last rSP 608, 609 before a nested speculative region was called. Nesting level 622, 623 may indicate the currently nesting level of the speculative regions. The rAX 624, 625 may be used to copy the value of nesting level 622, 623 and abort information when an abort occurs. The rFLAGS 626, 627 may be set to indicate statuses of why an abort occurred as well as indicate other statuses in the system. The synchronization facility 616, 617 may include speculate and commit commands, which may be implemented in microcode or circuits which may include registers and memory.

The memory 104 may include code with speculative region 630, 631, stacks 632, 633, code region 652, working set 636, 642, synchronization facility 650, and, optionally, current abort handler frame 648.

The code with speculative region 630, 631 may be code stored in the memory 104 that utilizes the synchronization facility 650 with speculate and commit commands that are executed by a core 602, 603. For example, the routines A, B, C, D, E, 200.1, 210.1, 210.2, 220.1, 220.2 may be speculative regions 630, 631. The code region 652 may be a portion of code that is executed by a core 602, 603. The stacks 632, 633 may be portions of memory 104 used to execute the code with speculative region 630, 631. The working sets 636, 642 may be memory locations 389, 639, 644, 645 that are used inside speculative regions of the code with speculative regions 630, 631.

The synchronization facility mechanism 650 may be an extension of the instruction set of the processor 102 that provides a synchronization facility. The synchronization facility 650 provides for atomic modification of multiple memory locations 638, 639, 644, 645 by a speculative region. Code with speculative region 630, 631 is executed by a core 602, 603. A speculative region may begin with a speculate command and end with a commit command. The speculative region may access memory locations in working set 636, 642 between the speculate and commit commands that are to be accessed atomically, which means that other regions of code should not access the memory locations 638, 639, 644, 645 between when a speculative region begins with a speculate command and when a speculative region ends with a commit command. So, while the speculative region is executing, the working set 636, 642 is only to be accessed by the speculative region. If a code region 652, which itself may be a speculative region, attempts to access one of the memory locations of the working set 636, 642, before the speculative region issues a commit command, then the synchronization facility 650 aborts either the code region 652 or the code with speculative region 630, 631. The code with speculative region 630, 631 may be aborted and then an attempt may be made to re-execute the code with speculative region 630, 631.

Figure 5:
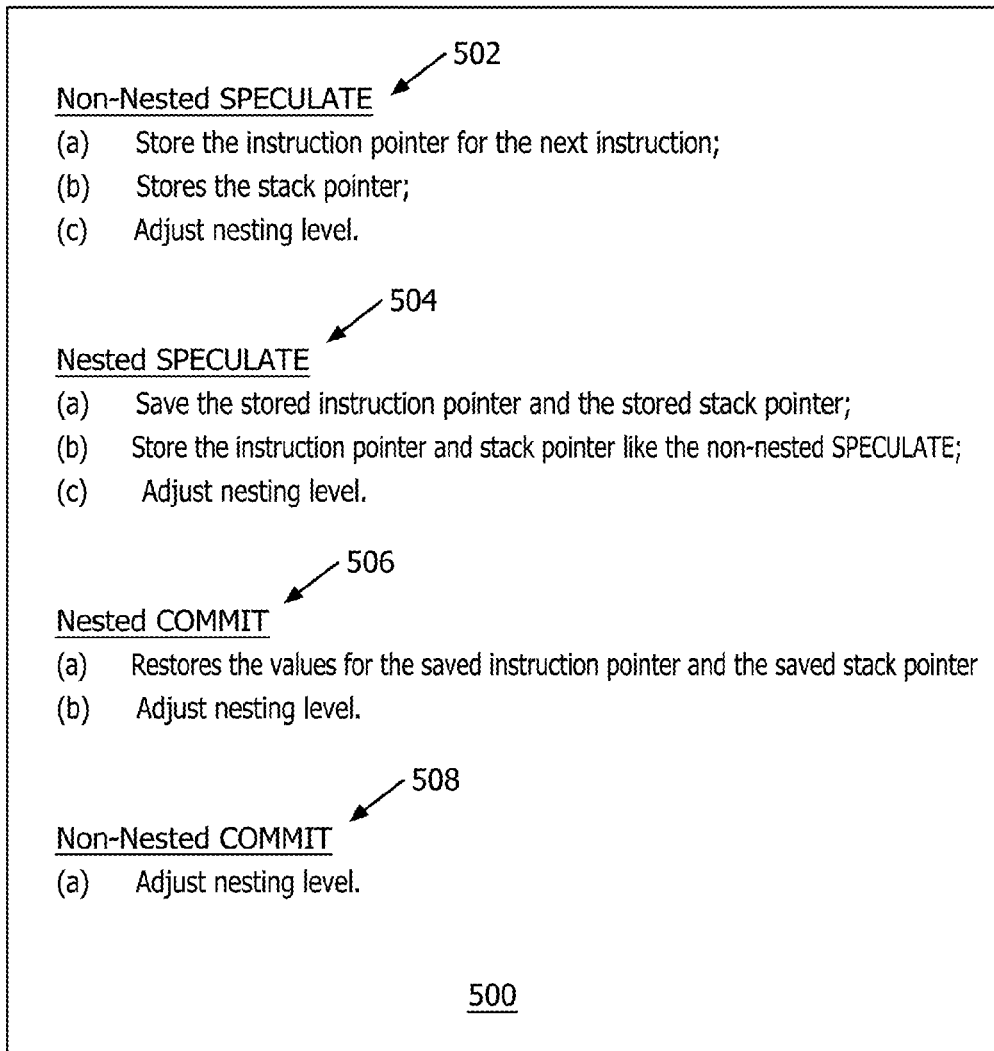
FIG. 5 illustrates examples of synchronization facility commands speculate, nested speculate, commit, and nested commit commands, in accordance with some embodiments.

FIG. 5 illustrates examples of synchronization facility commands 500 speculate, nested speculate, commit, and nested commit commands. Non-nested speculate 502 may be implemented as a command that (a) stores the instruction pointer for the next instruction, (b) stores the stack pointer, and (c) adjust nesting level. For example, referring to FIG. 4, when code with speculative region 630, 631 is executed by a core 602, 603 and a speculate command is executed the following may be performed. The rIP 610, 613 may be stored in saved_rIP 618, 619, and rSP 608, 609 may be stored in saved_rSP 620, 621, and the nesting level 622, 623 may be set to indicate that there is no nested speculative regions, which may be represented by one. A zero in nesting level 622, 623 may indicate that there is currently no active speculative region.

The nested speculate 504 may be implemented as a command that (a) saves the stored instruction pointer and the stored stack pointer, (b) stores the instruction pointer and stack pointer like the non-nested speculate, and adjusts the nesting level. For example, referring to FIG. 4, nested speculate 504 may be implemented as a command that pushes saved-rSP and saved-rIP on the stack 632, 633; stores the rIP 610, 613 in saved_rIP 618, 619, and stores rSP 608, 609 in saved₁₃ rSP 620, 621; and, changes the value of nesting level 622, 623 to indicate that the nesting level 622, 623 is greater by 1.

The nested commit 506 may be implemented as a command that restores the values for the saved instruction pointer and the saved stack pointer 506, and adjusts the nesting level. For example, referring to FIG. 4, nested commit 506 may be implemented as a command that pops saved-rSP, pops saved_rIP from the stack 624, 625, and reduces the value by one of nesting level 622, 623.

The non-nested commit 508 may adjust the nesting level. For example, the core 602, 603 may set nesting level 622, 623 to indicate there is no nesting, which may be represented by zero.

Figure 6A:
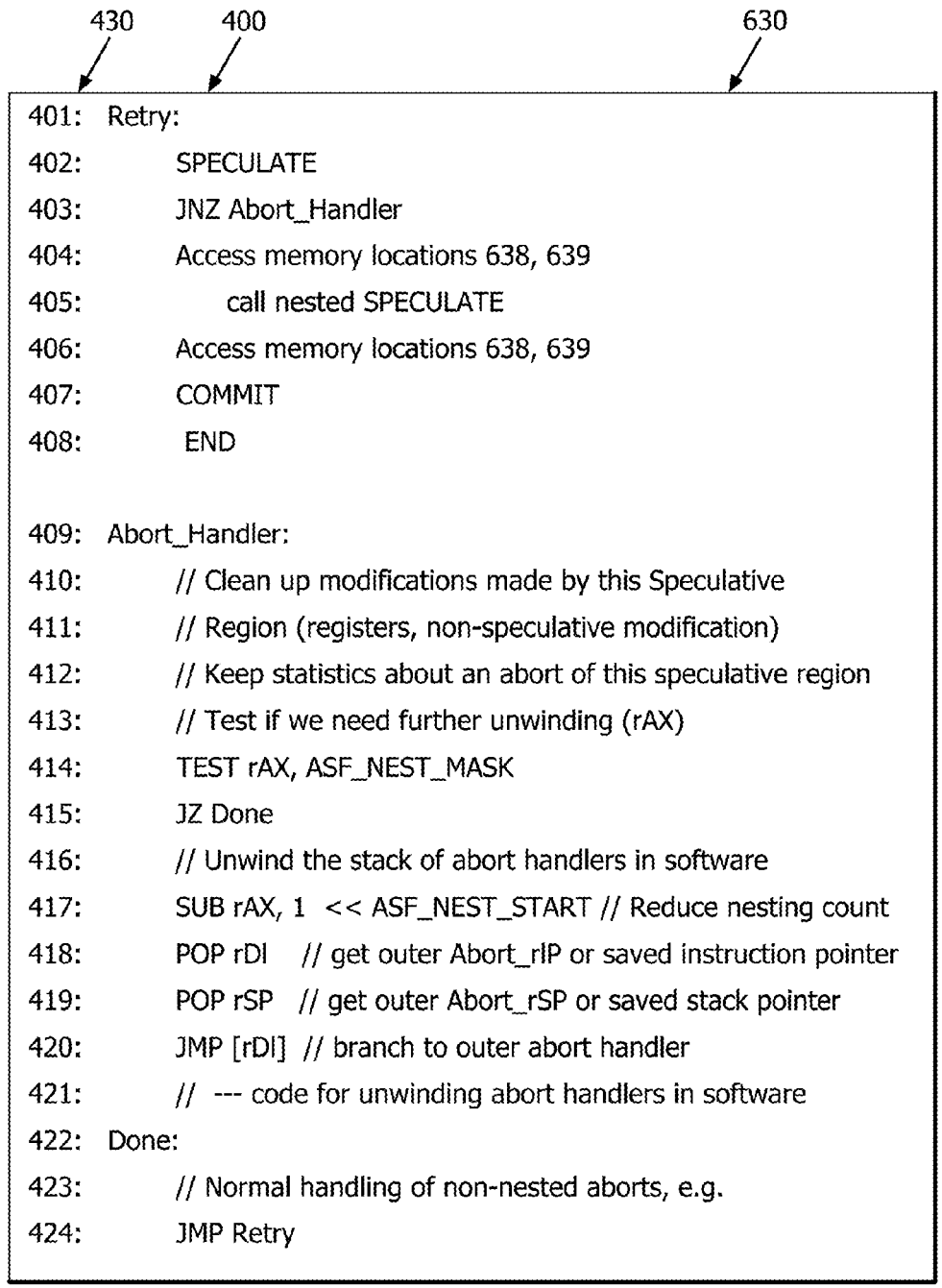

FIGS. 6A and 6B schematically illustrates code with speculative regions 630 (illustrated in FIG. 4) implemented with code 400. FIGS. 6A and 6B are explained in conjunction with method 300 of FIG. 3, apparatus of FIG. 4, and examples of synchronization facility commands 500. Referring to FIGS. 6A and 6B, line numbers 430 indicate the line number 430 of the code 400. Lines that begin with "//" are comments. For example, line 410 is comments. The nesting level may be kept in the nesting level 622 register as discussed in conjunction with FIG. 4. The code 400 may be executed by core 602. The code 400 is stored in memory 104 in speculative region 630. The nesting level 622 is initialed to 0 prior to the execution of code 400 so that at 310, the nesting level will be 0, so the nesting level indicates that the speculate region 402 is not a nested speculate region.

Referring back to FIG. 3, the method 300 begins with in response to beginning a speculate region 304. For example, the code 400 begins with line 401 which is a label "Retry:," and a convenient way for another line to refer to line 401. The code 400 then proceeds with a speculate region at line 402 with speculate.

The method 300 continues with is speculative region nested 306. For example, continuing with the example of FIGS. 6A and 6B, the synchronization facility 616 may determine as part of the speculate 402 command that speculate 402 is not nested based on the value in nesting level 622. The core 602 may set nesting level 622 to one to indicate the level of the speculate region, and set rAX 624 to zero to indicate to the application that there has not yet been an abort.

The method 300 continues with store link information to the abort handler associated with the speculative region 310. As part of the speculate command, the core 602 may store the instruction pointer rIP 610 in the location saved_rIP 618.

Additionally, as part of performing the speculate 402, the core 602 may store whether or not an abort has occurred in a location rFLAGS 626. The synchronization facility 616 on an abort will set rAX 624 to a non-zero value to include the nesting level 622 and abort information, set rFLAGS 626 to indicate an abort occurred, and restore the rIP 618 to "JNZ abort_handler" 403 so that on an abort, the core 602 will jump to line 409: "Abort_handler", since "JNZ abort_handler" 403 will jump to abort_handler 409, if rFLAGS 626 is not zero.

If there is an abort during the execution of the speculative region (after speculate 402 and before commit 407), and not during a nested speculative region, then the synchronization facility 616 will copy saved_rIP 618 into rIP 610. The code line 403, "JNZ Abort_Handler", will then be executed and since JNZ will be true, because rFLAGS 626 is not zero, execution will jump to code line 409, Abort_handler. Thus, store link information to the abort handler associated with the speculative region 306 is performed.

As part of performing the speculate 402, as discussed in conjunction with FIGS. 4 and 5, the core 202.1 may store the stack pointer rSP 608 in location saved_rSP 620 The saved_rSP 620 may be used to restore the stack pointer rSP 608 if the current speculate region 402 is aborted. The stack pointer rSP 608 points to a location in the stack 624 which is a portion of memory 104 that is being used by the speculate region 620.

The method 300 may then continue with in response to entering a speculate region 304. For example, continuing with the example in FIG. 6, the core 602 may access memory location 638, 639, 644, 645. Memory location 638, 639, 644, 645 250 may be memory location 638 which is part of working set 636 of FIG. 4. Then the core 602 may execute nested speculate 405, which refers to label nested speculate 451 of FIG. 6B. The code 400 may continue with speculate 452, which enters a speculative region.

The method 300 may continue with is speculative region nested 306. As part of performing the speculative command 452, nesting level 622 is used to determine whether the speculate 452 is nested. When speculate 402 was executed, nesting level 622 was incremented to 1, so the nesting level is 1 and does indicate the speculate 452 is nested. The core 602 increments nesting level 622 by 1 so that nesting level 622 is now 2.

The method 300 may continue with store link information to the abort handler associated with the previous speculative region 308. For example, as part of performing the speculate 452, the core 602 may push the saved_rIP 618 and the saved_rSP 620 on the stack 624, which may increment the stack pointer 624, rSP 608.

The method 300 may continue with store link information to the abort handler associated with the speculative region 310. For example, as part of performing the speculate 452, the core 602 may store the instruction point rIP 638 in the location saved_rIP 618. The core 602 may store the stack pointer rSP 608 in location Saved_rSP 620. The saved_rSP 620 may be used to restore the stack pointer rSP 608 if the current speculate region 402 is aborted. The method 300 continues with returning to start 302.

The method 300 may continue with in response to entering a commit command 306. For example, continuing with the example of FIG. 6, the core 602 may execute the instructions associated with access memory locations 644, 645. For example, the core 602 may access memory location 644 of working set 642. The core 602 may then execute commit 455.

The method 300 may continue with is commit nested 322. For example, continuing with the example of FIG. 6, nesting level 622 is 2, so this indicates that the commit is a nested commit as nesting level 622 is greater than 1.

The method 300 may continue with restore link information to the abort handler associated with the previous speculative region 324. For example, continuing with the example of FIG. 6, the core 602 may retrieve the saved_rIP 618 and saved_rSP 620 from the stack 632 that were stored on the stack 632, and place the retrieved saved_rIP 618 into the saved_rIP 618, and place the retrieved saved_rSP 620 into the saved_rSP 620. The core 602 may decrease the nesting level indicated by nesting level 622 by 1.

The method 300 may continue with removing link information to the abort handler associated with the corresponding speculative region 322. For example, continuing with the example of FIG. 6, the link information to the abort handler associated with the speculate 452 may have been removed by the core 602 retrieving the saved_rIP 618 from the stack 624 and putting it in saved_rIP 618.

The method 300 may continue with returning to start 302. The method 300 may continue with in response to entering a commit command 306. For example, continuing with the example of FIG. 6, the core 602 may execute the instructions associated with access memory locations 638, 639 at line 406. For example, memory location 638, 639 may be memory location 638 and memory location 639 of working set 636. The core 602 may then execute commit 407.

The method 300 continues with is the nesting level nested 306. For example, continuing with the example of FIG. 6, nesting level 622 is 1, so this indicates that the commit is not a nested commit as nesting level 622 is not greater than 1. As part of performing commit 407, the core 602 may set nesting level 622 to 0. And, the core 602 may decrement rSP 608 by two locations to put rSP 608 back to where it was prior to the speculate 402.

The method 300 continues with stop. For example, continuing with the example of FIG. 6, the core 602 may continue to execute the code in 630, but since there are no pending speculative regions the synchronization facility 616 may not be used again.

Alternatively to the code 400 example above, the method 300 may continue with in response to an abort command 312. For example, in the example of FIG. 6, when the code 630 is in speculative region, lines 402 through 407, another speculative region 631 or code region 652 may access the memory locations 638, 639, or when the code 630 is in speculative region, lines 452 through 455, for the inner speculative region, another speculative region 631 or code region 652 may access the memory locations 644, 645. The synchronization facility 650 may then abort the speculative region, lines 402 through 407, or the inner speculative region, lines 452 through 455.

The method 300 continues run abort handler associated with the aborted speculative region 314. For example, continuing with the example of FIG. 6, the core 602 may be executing instructions at line 404, when the synchronization facility 650 determines to abort the speculative region 630, which corresponds to the code lines 402 through 407 and may include codes lines 409 through 424. The rIP 610 is then set to saved_rIP 618, which in this case would be line 403, "JNZ Abort_Handler." For example, continuing with the example of FIG. 6, the core 602 would execute line 403 "JNZ Abort_Handler" and since rFLAGS 626 is not zero, the core 602 would jump to line 409. And, then as indicated in the comments of lines 410-413, the core 602 may clean up non speculative portions of memory and registers as well as keep statistics regarding the number of aborts of the speculative region 620.

The method 300 may continue is aborted speculative region nested 316. For example, continuing with the example of FIG. 6, the core 602 may execute line 414 which tests whether or not the rAX 624 register indicates that there is nesting or not, since the value of the nesting level 252.1 is copied into rAX 624 when an abort occurs. In this example, the rAX 624 would indicate that there is not nesting, so the core 602 would execute line 422 "JZ Done," and the results of the test in line 414 are 0, then the core 602 next executes line 423. The example may continue with "JMP Retry" line 424 which would bring the core 602 back to line 401 to retry the speculative region 402 through 407.

Alternatively to the code 400 example above, the method 300 may continue with in response to an abort command 312, where the abort occurs in the nested speculative region of lines 452 through 455. For example, in the example of FIG. 6, when the code 630 is in nested speculative region, lines 452 through 455, another speculative region 631 or code region 652 may access the memory locations 644, 645. The synchronization facility 650 may then abort the nested speculative region, lines 452 through 455.

The method 300 continues run abort handler associated with the aborted speculative region 314. For example, continuing with the example of FIG. 6, the core 602 may be executing instructions at line 454, when the synchronization facility 616 determines to abort the speculative region 631. The rIP 610 is then set to saved_rIP 618, which in this case would be line 453, "JNZ Nested_Abort." And, in an abort, nesting depth 622 and abort information is put into rAX 624 and rFLAGS 626 is set according to values in rAX 624. For example, continuing with the example of FIG. 6, the core 602 would execute line 453 "JNZ Nested Abort" and since rFLAGS 626 is not zero, the core 602 would jump to line 457. And, then as indicated in the comments of lines 458-461, the core 602 may clean up non speculative portions of memory and registers as well as keep statistics regarding the number of aborts of the speculative region 620.

The method 300 may continue is aborted speculative region nested 316. For example, continuing with the example of FIG. 6, the core 602 may execute line 462 which tests whether or not the rAX 624 register indicates that there is nesting or not. In this example, the rAX 624 would indicate that there is nesting as rAX 624 would be 2, so the core 602 would execute line 465, which subtracts 1 from rAX 624. The core 602 would then execute lines 466 through 468. Line "POP rDI" 466, takes the saved_rIP 618 previously stored on the stack 632 and puts it in a temporary place rDI. Line "POP rSP" 467 takes the previously stored saved_rSP 620 and puts it in rSP 608, which was the stack pointer to the speculative region 402 through 407. The core 602 then executes "JMP [rDI]" 468, which transfer control to line 403 "JNZ Abort_Handler".

For each previous speculative region, running the abort handler of the previous speculative region 318. Continuing the example of FIG. 6, there is only one more abort handler to run and that is the abort handler for speculative region 402 through 407. Continuing with the example above, as disclosed above, the core 602 executing line "JNZ Abort_Handler" 403 after an abort would run the abort handler for the speculative region 402 through 407.

The method 300 would then continue with returning to start 302. The core 602 would then jump to line 401 "Retry" and attempt to execute the speculative region 402 through 407 again.

Figure 7:
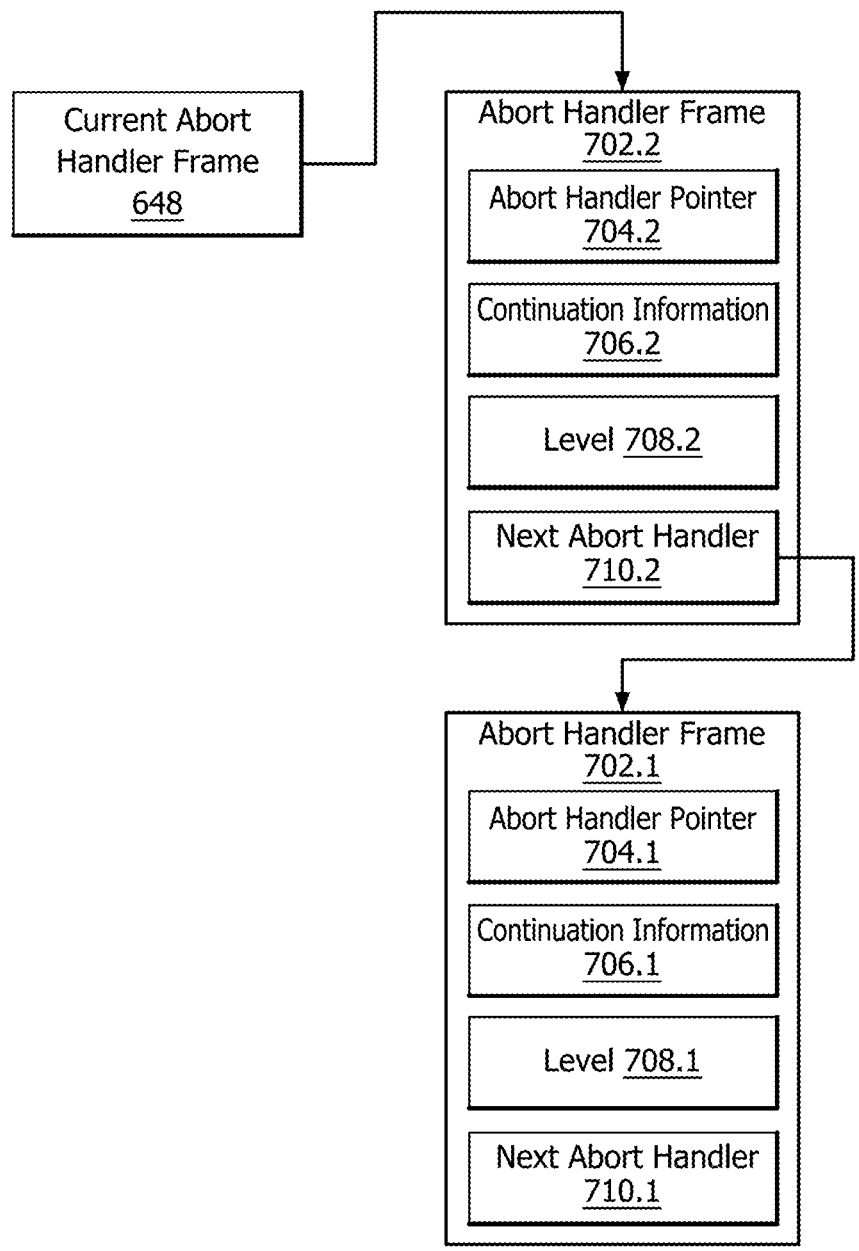
FIG. 7 illustrates an example of a synchronization facility for nested speculative regions, in accordance with some embodiments.

FIG. 7 illustrates an example of a synchronization facility for nested speculative regions. Illustrated in FIG. 7 is abort handler frames 702 and current abort handler frame 648.

The abort handler frame 702 includes abort handler pointer 704, continuation information 706, level 708, and next abort handler 710. Code with speculative region 630 includes code that creates the abort handler frame 702 in the stack before a speculate instruction.

The abort handler pointer 704 is a pointer to an abort handler for the current speculative region 630. Continuation information 706 is register state including the stack pointer to revert to for the abort handler. Level 708 is a level of nesting of the speculative region 630. Next abort handler 710 is a pointer to a previous abort handler frame 702.

The current abort handler frame 264 (see also FIG. 4) points to the current abort handler frame 702. Before entering a new speculative region in code with speculative region 631, the abort handler frame 702.2 is created on the stack 633, and populated with the required information, and then chained to the old current_AH_frame 702.1, if the speculative region 630 is a nested speculative region. Current abort handler frame 648 is updated to point to the current abort handler frame 702.2.

On an abort, the abort handler frames 702 are traversed by a routine that calls each of the abort handlers for each abort handler frame 702 by using the abort handler pointer 704 and linking to the previous abort handler frame 702 using next abort handler 710. The routine may check to level 708 of the abort handler frame 702, and if the level 708 is greater than a level of nesting indicated by a nesting counter, then the routine will not call the abort handler associated with the abort handler frame 702. Thus, the method 300 may be performed using abort handler frames 702.

Examples of disclosed embodiments of the synchronization facilities provide the advantage that nesting is supported such that multiple speculative regions can be contained within another speculative region, which allows speculative regions to call functions that themselves use the synchronization facility.

Examples of disclosed embodiments of the methods, apparatus, and computer readable medium for nested speculative regions have the advantage of calling nested abort handlers whereas current synchronization facilities only notify the outermost speculative region of an abort, thus ignoring abort handlers registered by nested speculative regions, which may clean up memory locations and registers, and may keep statistics on the number of aborts. The omission of calling abort handlers of nested speculative regions means that nested code must not rely on the abort handler ever being called in case of an abort. This will restrict what the code in nested speculative regions can do. For example, the nested code cannot use the abort handlers to do clean-up of non-speculative modifications it has done inside the speculative region.

Examples of disclosed embodiments of the methods, apparatus, and computer readable medium for nested speculative regions have the advantage of calling nested abort handlers whereas current, so that statistics of success-abort rates to determine future behavior can be calculated.

The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). The computer-readable storage may be non-transitory.

What is claimed is:

1. A method of performing an abort of a speculative region of code in nested speculative regions of code, the method comprising:
    in response to entering a nested speculative region of code, storing link information to an abort handler associated with a previous speculative region of code, wherein the link information is used by an abort handler associated with the nested speculative region of code to link the abort handler associated with the nested speculative region of code with the abort handler associated with the previous speculative region of code; and
    in response to a commit command, removing link information from the abort handler.

2. The method of claim 1, wherein when the commit command is nested, the method further comprises restoring link information to the abort handler associated with the previous speculative region of code.

3. The method of claim 1, wherein in response to an abort command, the method further comprises running the abort handler associated with the aborted speculative region of code.

4. The method of claim 3, wherein the method further comprises for each previous speculative region of code, running an abort handler associated with each previous speculative region of code.

5. The method of claim 3, wherein running the abort handler associated with the aborted speculative region of code, further comprises:
    transferring program control to a location in a saved instruction pointer register.

6. The method of claim 5, wherein for each previous speculative region of code, running the abort handler of each previous speculative region of code, further comprises:
    retrieving a saved instruction pointer from a stack, and running the abort handler of each previous speculative region of code by transferring program control to a second location in the retrieved saved instruction pointer.

7. The method of claim 3, wherein running the abort handler associated with the aborted speculative region of code, further comprises:
    transferring program control to an abort handler pointed to by a current abort handler frame, wherein the current abort handler frame is stored in a thread local memory.

8. The method of claim 1, further comprising:
    accessing memory locations of a working set; and, wherein a second core accessing the memory locations of the working set triggers the abort command.

9. The method of claim 1, further comprising:
    incrementing a nesting level in response to each speculate command and decrementing the nesting level in response to each commit command.

10. The method of claim 1, wherein in response to entering the speculative region of code, comprises:
    allocating memory for an abort handler frame;
    storing link information to an abort handler associated with the previous speculative region of code in the abort handler frame;
    storing a level in the abort handler frame; and
    storing link information to an abort handler associated with the previous speculative region of code in the abort handler frame.

11. The method of claim 10, wherein in response to an abort command, comprises:
    retrieving a current abort handler frame;
    if the level of the abort handler frame is not greater than a current nested level, then running the abort handler associated with the aborted speculative region of code by running the abort handler associated with the abort handler frame;
    if the aborted speculative region of code is nested, then for each previous speculative region of code, running the abort handler of the previous speculative region of code by setting the current abort handler frame to the next abort handler of the current abort handler frame, and running the abort handler associated with the abort handler frame.

12. The method of claim 1, wherein storing link information to an abort handler associated with the speculative region of code, further comprises: storing an instruction pointer to a saved instruction pointer register.

13. The method of claim 1, wherein storing link information to an abort handler associated with the previous speculative region of code, further comprises:
 storing an instruction pointer to an abort handler frame created in a stack.

\* \* \* \* \*